Dec. 30, 1924.　　　　　　　　　　　　　　　　　　1,520,728
F. M. SLATER
FLUID ACTUATED INLET VALVE FOR ROCK DRILLS
Filed Dec. 6, 1921　　　　2 Sheets-Sheet 2

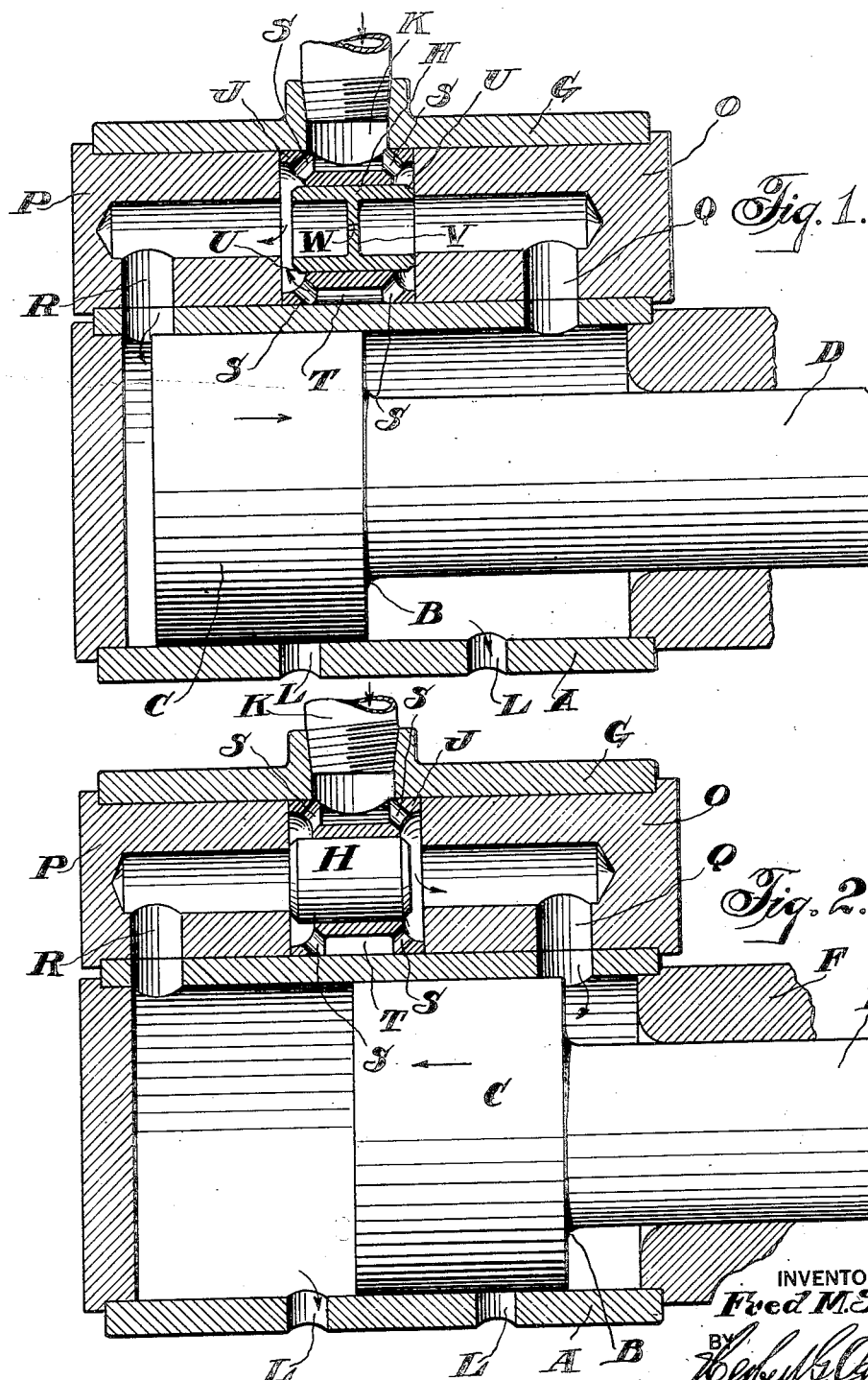

INVENTOR
Fred M. Slater.
HIS ATTORNEY

Patented Dec. 30, 1924.

1,520,728

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

FLUID-ACTUATED INLET VALVE FOR ROCK DRILLS.

Application filed December 6, 1921. Serial No. 520,345.

*To all whom it may concern:*

Be it known that I, FRED M. SLATER, a citizen of the United States, and a resident of Easton, county of Northampton, and State of Pennsylvania, have invented a certain Fluid-Actuated Inlet Valve for Rock Drills, of which the following is a specification accompanied by drawings.

This invention relates to fluid actuated rock drills, but more particularly to a fluid actuated valve controlling only the inlet supply, the exhaust being controlled by the piston.

The objects of the invention are to secure a valve which will start more readily than valves of this class have done, and also permit a later starting of the compression in the ends of the cylinder, by admitting a small quantity of live motive fluid which raises the pressure more quickly in the closed end of the cylinder to that required for throwing the valve, than if the compression alone is depended upon, thus permitting a greater travel of the piston before the closing of the free exhaust.

Further objects of the invention will hereinafter appear and to all of these ends the invention is shown in the accompanying drawings, in which—

Figure 1 is a diagrammatic longitudinal sectional view of so much of a rock drill as will serve to illustrate the invention, with the piston starting on the beginning of its forward stroke.

Figure 2 is a similar view with the piston starting on its rearward stroke,

Figure 3:
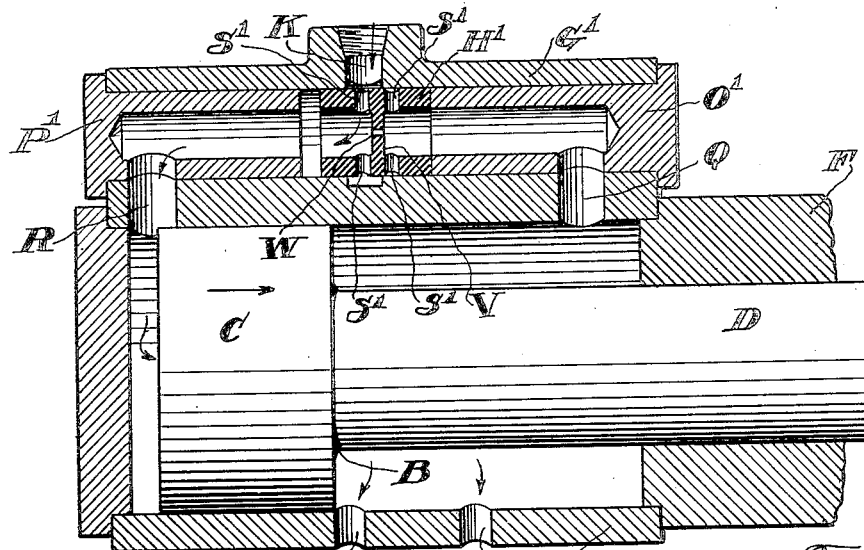
Figures 3 and 4 are similar views of a modification of the valve.

Referring to the drawings, the cylinder A is provided with the reciprocating piston B having the head C and the forward shank or extension D, passing through the front cylinder washer F. A valve chest G, of any suitable construction, which may form a part of the cylinder A, is located at one side of the cylinder and a fluid actuated valve H operates in said valve chest in the cage J and controls only the inlet supply K. Free exhaust ports L, of which there may be any desired number, in this instance two being indicated, are controlled by the piston head C.

The valve chest may be closed by the valve chest bushings O and P as a suitable construction, and supply passages Q and R lead from each end of the valve chest to corresponding ends of the cylinder.

The valve cage J may be of any suitable form, in this instance a cylindrical cage being shown, having the ports S and the peripheral groove T communicating with the inlet K. The valve H may be of any suitable form or construction, in this instance a cylindrical valve being shown, having the beveled ends U and the central web V, in which a small port W is provided, constantly admitting motive fluid to that one of the supply passages, which is closed by the valve, so that the valve is thrown by the live motive fluid passing to that end of the valve through said small port W and building up pressure at that end when the piston closes the exhaust L to the corresponding end of the cylinder A. This small port W is preferably located in the valve itself, as a suitable and simple construction, but obviously might be located in any position in which it may accomplish the same function.

In the operation of the apparatus, let it be assumed, that the piston is starting on its forward stroke, as indicated in Figure 1, and that the valve is in the position indicated in said figure, in which case motive fluid is admitted behind the piston to drive it forward. Motive fluid is also constantly admitted through the small port W and passes through the cylinder to atmosphere until the exhaust port L for the forward end of the cylinder is closed by the piston head. Pressure is then built up in front of the piston and the valve is quickly thrown rearwardly to the position indicated in Figure 2. Motive fluid is then admitted in front of the piston head C to drive the piston rearwardly and motive fluid also passes through the small port W in the valve to atmosphere, through the cylinder behind the piston, until the exhaust at that end of the cylinder is closed by the piston on its rearward stroke, at which time the valve is thrown forwardly by the building up of pressure behind the valve.

It is to be observed that there is a certain throttling of the motive fluid passing from the inlet K through the aperture S in the valve cage J, which tends to produce a vacuum either behind or in front of the valve, according to the direction in which the air is passed to the cylinder. Likewise, there will be full line pressure on the opposite end of the valve, which tends to throw the valve more quickly at the desired moment, by the building up of pressure as described.

Figure 4:
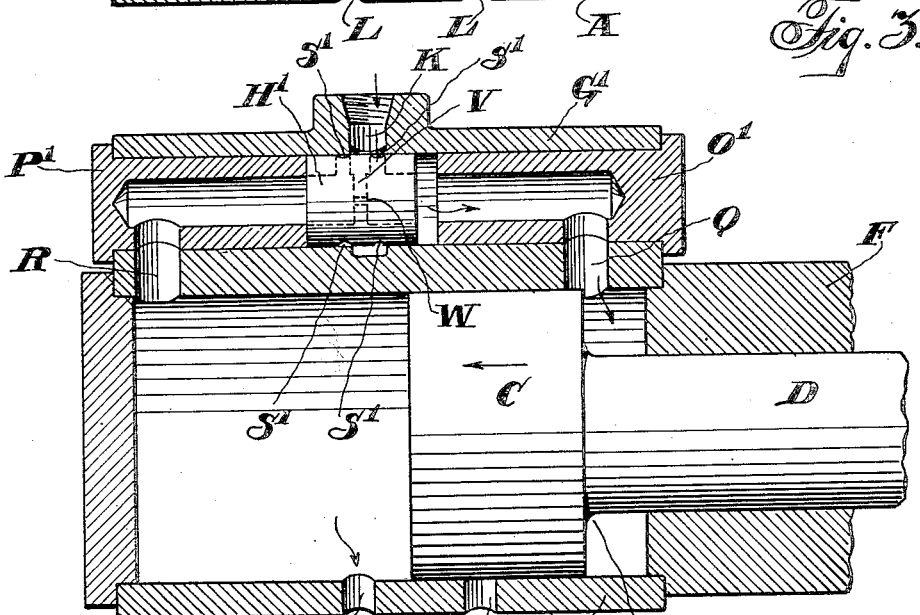

In the modification shown in Figures 3 and 4, the valve cage is dispensed with, and the valve chest G' and valve chest bushings O' and P' are somewhat different in shape, but otherwise the same as in the other figures. The inlet valve H' is cylindrical in shape and provided with a central web V and small port W, which has the same function as the small port W shown in Figures 1 and 2. The valve H' is also provided with ports S' for controlling the main supply. The operation of the valve shown in Figures 3 and 4, is similar to that indicated in Figures 1 and 2 and need not be further described.

I claim:

In a fluid actuated rock drill, the combination with a cylinder and reciprocating piston of a valve chest having a hollow cylindrical fluid actuated valve of uniform external diameter therein controlling only the inlet supply, said valve having a smooth unbroken periphery and a transverse internal web, supply passages leading from each end of the valve chest to corresponding ends of the cylinder, a free exhaust port controlled by the piston and a small longitudinal port extending through the internal web of the valve permitting the flow of motive fluid through the valve from end to end, first in one direction and then in the other, to assist or hasten the compression in that end of the cylinder last opened to exhaust.

In testimony whereof I have signed this specification.

FRED M. SLATER.